Jan. 23, 1951 C. E. IVES 2,538,906
DICER ASSEMBLY
Filed Aug. 7, 1948 5 Sheets-Sheet 1

INVENTOR.
Clifford E. Ives.
BY
Atty.

Jan. 23, 1951  C. E. IVES  2,538,906
DICER ASSEMBLY
Filed Aug. 7, 1948  5 Sheets-Sheet 2

INVENTOR.
Clifford E. Ives.
BY
Carl V. Geppert
Atty.

Jan. 23, 1951 — C. E. IVES — 2,538,906
DICER ASSEMBLY
Filed Aug. 7, 1948 — 5 Sheets-Sheet 3

INVENTOR.
Clifford E. Ives.
BY

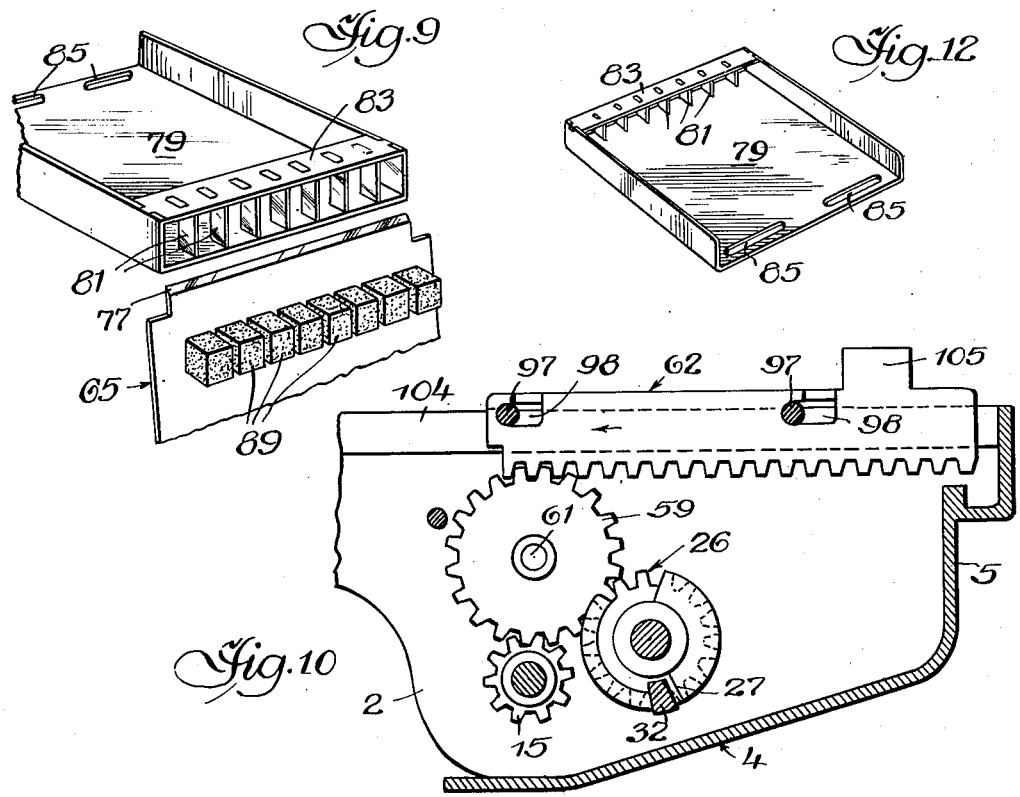
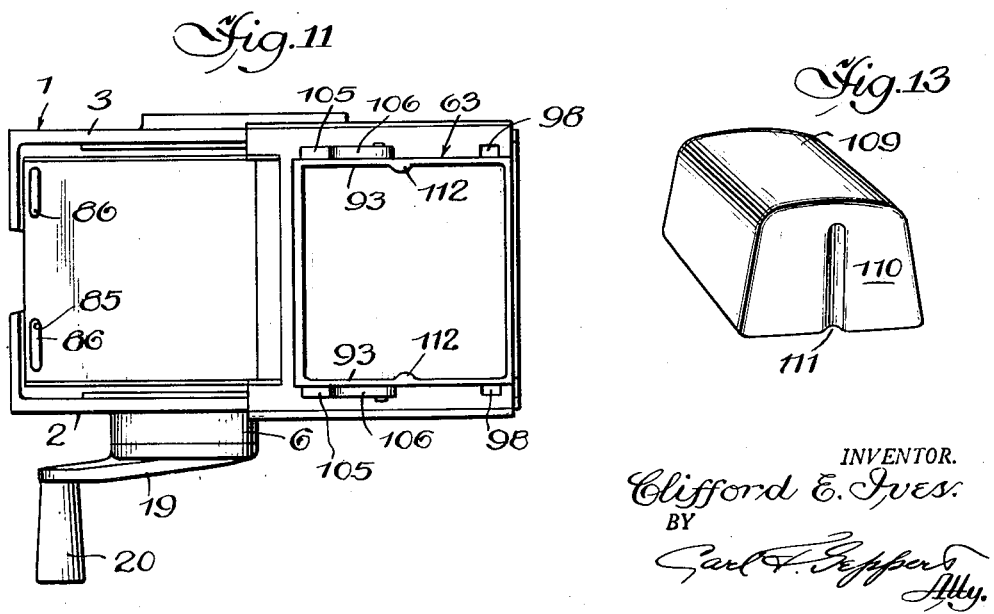

Patented Jan. 23, 1951

2,538,906

UNITED STATES PATENT OFFICE 2,538,906

DICER ASSEMBLY

Clifford E. Ives, Wilmette, Ill., assignor to Sears, Roebuck and Co., Chicago, Ill., a corporation of New York Application August 7, 1948, Serial No. 43,075

7 Claims. (Cl. 146—78)

The present invention relates to a novel construction for dicing products such as vegetables, fruits or other produce which are suitable for dicing into small uniform cubical sections, for making salads or fruit cocktails.

Among the objects of the present invention is the provision of a novel dicer construction and assembly that will quickly and positively dice or cut products into cubical sections or pieces of approximately uniform dimensions, and in which the operator introduces the produce to be diced with one hand and with the other hand rotates the crank handle continuously until the produce so introduced has been completely diced.

A further object of the present invention is the provision of a novel operating means and mechanism for a dicer assembly for successively cutting layers of the produce to be diced into a plurality of substantially uniform pieces.

Such operating means and mechanism includes a novel drive mechanism for intermittently and automatically moving the hopper containing the product to be diced a predetermined distance during each revolution of the drive shaft, synchronously cutting from the product a plurality of diced sections, and at the end of the forward stroke of the hopper when a complete layer has been removed and diced, quickly and automatically returning the hopper and remainder of the product for a new series of cuts. The operating mechanism for intermittently feeding the product and the cutting blades for successively dicing a layer of the product so fed are so constructed, designed, arranged and related as to automatically carry out these operations in rapid succession by continuous rotation of the drive shaft through suitable drive mechanism.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings—

Fig. 9 is a view in perspective of the cutting pan and cut-off blade assembly at the instant the cut-off blade has been retracted or lowered and showing the diced sections being discharged after the completed cutting operation.

Fig. 10 is an enlarged fragmentary view in vertical cross section taken in a plane represented by the line 10—10 of Fig. 6.

Fig. 11 is a plan view similar to Fig. 3 but showing the hopper at the limit of its forward stroke and prior to its return to a position for beginning a series of dicing operations.

Fig. 12 is a perspective view of the cutting pan assembly.

Fig. 13 is a perspective view of a pressure block for feeding the produce to the cutting blades.

Figure 4:
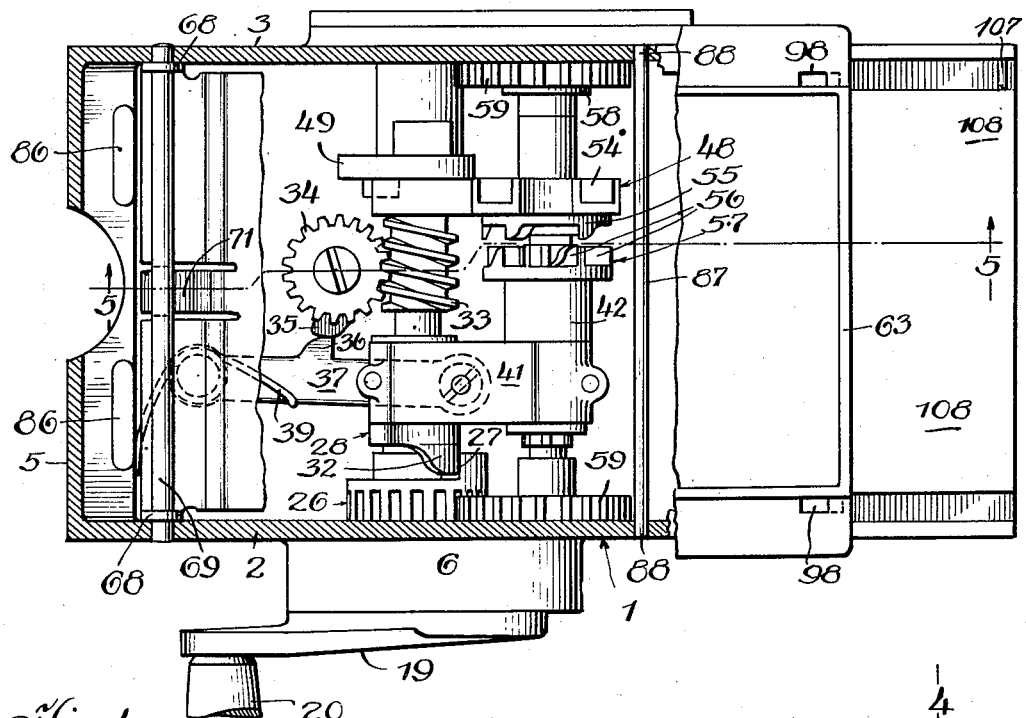
Fig. 4 is an enlarged view, part in horizontal cross section and part in plan, the view being taken on the irregular line 4—4 of Fig. 5.

The dicer comprises a hollow main housing 1 for receiving and enclosing the operating mechanism and having opposite side walls or frame members 2 and 3 (Fig. 4), a base 4 and an end wall 5, all preferably cast or formed as an integral unit. As shown more clearly in Fig. 8, the side wall 2 is provided with an embossment 6 in which is provided a bearing 7 having a bushing 8 press fitted therein and adapted to receive one end 9 of a drive shaft 11, and also provided with a bearing 12 spaced from the bearing 7 for receiving a reduced sleeve 13 of a hub 14 on a pinion 15 pinned at 16 to one end of a driven shaft 17 and journalled in a bushing 18 press fitted into the bearing 12.

Figure 1:
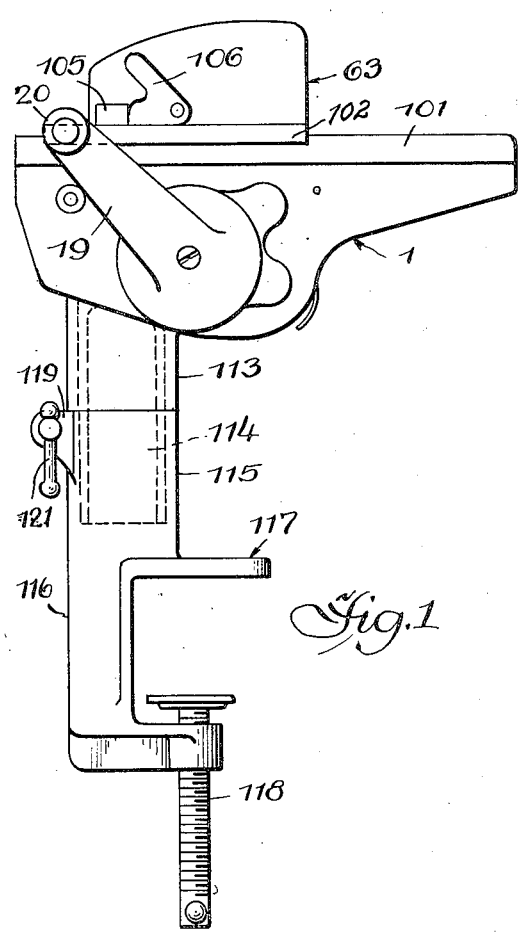
Figure 1 is a side elevational view of the novel dicer assembly with the feed hopper shown in retracted position and ready for the dicing operation.
Figure 2:
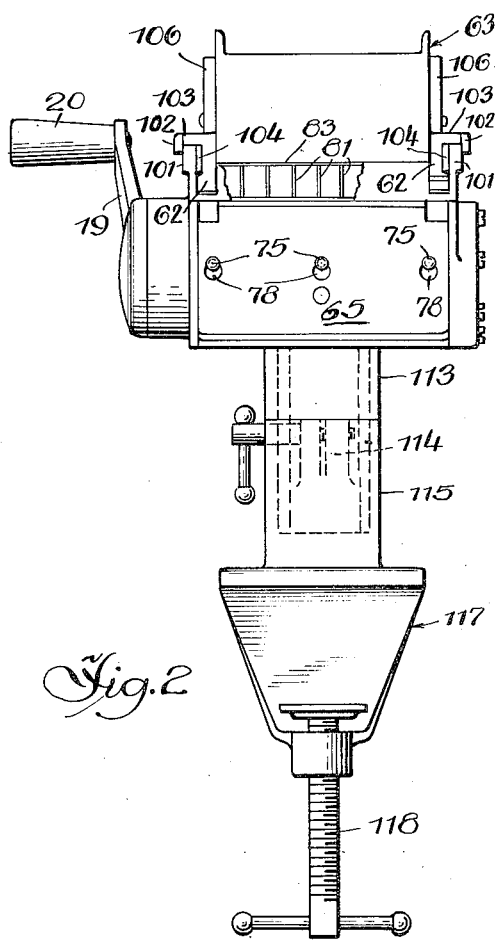
Fig. 2 is an end elevational view thereof with a portion of the frame or end of the main housing broken away to more clearly disclose the cutter assembly.
Figure 3:
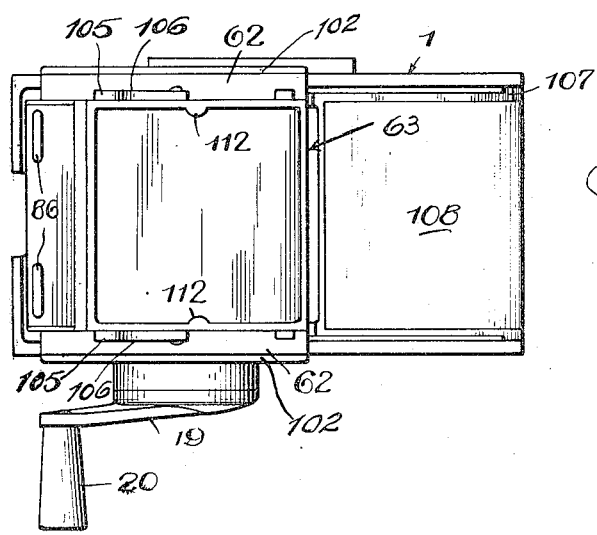
Fig. 3 is a top plan view of the novel assembly shown in Figs. 1 and 2.
Figure 5:
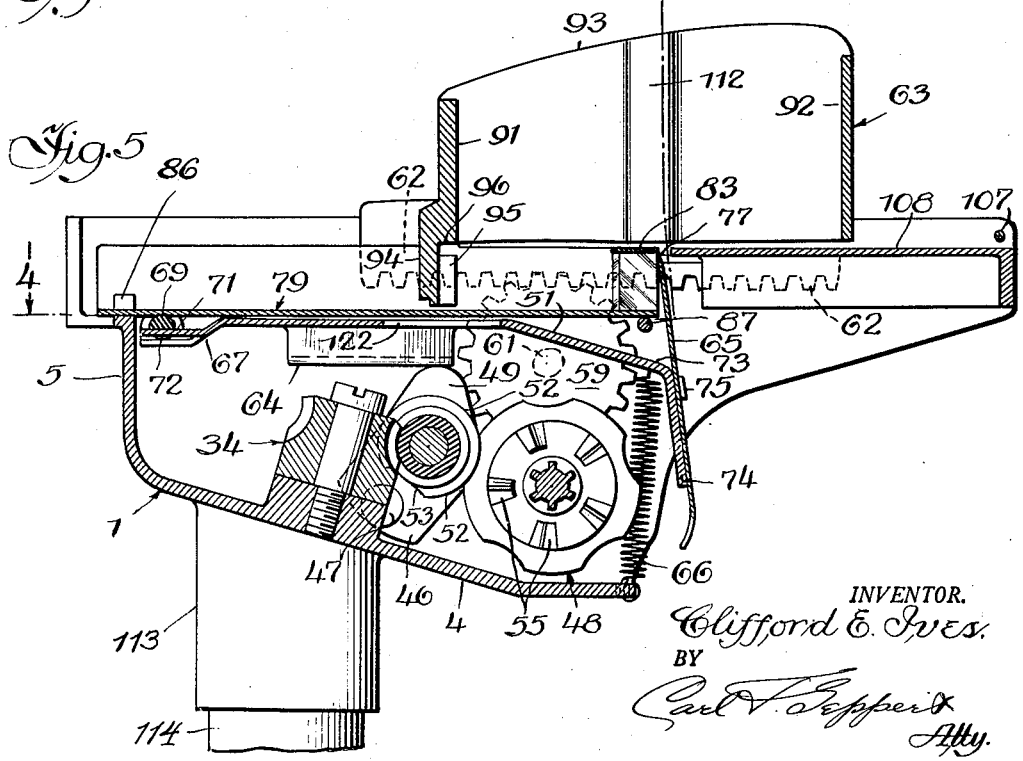
Fig. 5 is a view in vertical cross section taken in a plane represented by the line 5—5 of Fig. 4, and showing the relation of the hopper and operating mechanism as the hopper is being returned to its retracted position.

The drive shaft 11 is rotated in a clockwise direction, Fig. 5, by a crank arm 19 and handle 20 (Figs. 1, 2 and 3), or by a suitable power drive. To enable the operation by power, the embossment 6 (Fig. 8) is provided with an annular flange 21 having an internal thread 22 adapted to receive the mount of a motor which may then be screwed into the thread 22 as a coupling on the motor shaft automatically aligns with keyways 23 on the end of the drive shaft 11.

The drive shaft 11 extends across the housing with the opposite end 24 journalled in a bushing 8 in the side wall 3 in an end bearing plate 25. On this shaft adjacent its other end 9 and within the housing is loosely mounted a rack gear 26 having one face contoured to provide a side lug 27. A slidably mounted sleeve 28 internally fluted to receive the splines 29 on the shaft 11 is rotatable on but may be moved axially of the shaft. The sleeve 28 is provided at one end with an eccentric cam 31 for raising a knife holder 51 each time the sleeve is rotated through a complete revolution. The sleeve is also provided with a projection 32 for engaging the lug 27 and thereby rotating the return gear 26 when the sleeve is moved axially to effect such engagement.

On the drive shaft adjacent the splines 29 and sleeve 28 is a worm 33 in continuous mesh with a worm pinion 34 rotatably mounted upon a fillister head screw 30 and provided with a cam lug 35 adapted to engage once during each revolution of the worm gear with a projection 36 provided on a clutch-actuating arm 37. This arm is pivoted at 38 and is spring-biased by a coil spring 39 to move in a counterclockwise direction Fig. 6. The other end 40 of arm 37 is connected to the lower half of a split collar yoke 41, the two halves of which encompass the slidably mounted sleeves 28 and 42.

A sleeve 45 on shaft 11 carries an arm 46 mounting a Geneva drive pin 47 for engaging and driving a Geneva gear 48 loose upon the driven shaft 17, as well as cam 49 similar to and axially aligned with the cam 31 for elevating and operating a blade holder or support 51 (Figs. 5 and 7) a ring 52 integral with sleeve 48 has a segment 53 thereof removed for passing the Geneva gear 48. The Geneva drive pin 47 is adapted to be received in one of five successive, radial slots 54 provided in one face of the Geneva gear 48 and in each revolution of the sleeve 45 the Geneva gear is rotated through one-fifth of a revolution.

On the opposite face of the Geneva gear disc 48 are provided clutch lugs 55 adapted to engage similar lugs 56 on the clutch face 57 of sleeve 42. Accordingly, movement of the Geneva gear 48 is transmitted to the driven shaft 17.

Pinned to the opposite end of shaft 17 is a pinion 58 similar to pinion 15 and each meshes with a larger, intermediate gear or pinion 59 (Fig. 10) mounted upon stub shafts 61 (Figs. 6, 7 and 10) which in turn mesh with opposed rack bars 62 on the hopper 63 for carrying the articles to be diced. Thus, the successive increments of rotation which are imparted to shaft 17 and which are correspondingly translated into intermittent advances of the hopper 63 ultimately cause hopper 63 to achieve an extreme position, such as that illustrated in Fig. 11. After each incremental movement the hopper or carriage 63 comes to rest for a brief moment and during this dormancy the knife 65, as will now be explained, is moved upwardly to cut off the extruded produce strips after the manner illustrated in Fig. 9.

In the disclosed embodiment selected to illustrate the novel invention, the mechanism and gearing is so designed and co-related that eight forward revolutions on the crank makes eight successive cuts, and on the ninth revolution of the crank the hopper or vegetable containing receptacle 63 is rapidly returned to its original position to begin a new series of dicing cuts.

To accomplish the return of the hopper 63, the worm 33 and the worm gear 34 have a gear ratio of 9 to 1 so that for each nine revolutions of the drive shaft 11, the worm gear is rotated through one complete revolution. During the first eight revolutions of the drive shaft 11, the Geneva gear 48 and its clutch face are maintained in driving engagement with the clutch sleeve 42. During the ninth revolution of the drive shaft 11, the cam projection 35 rides over the lug 36 on the clutch actuating arm 37 and moves this clutch arm away, simultaneously coupling the driving lug 32 with the lug 27 on the rack return gear 26 and uncoupling the lugs 56 on the clutch face 57 from the driving lugs 55 on the Geneva gear 48. Thus at such time the driven shaft is free and may be rotated in the reverse direction through the now engaged rack return gear 26. Such engagement causes the gear 26 to drive the intermediate or rack driving gear 59 with which it is in meshing engagement in a direction reverse to that previously given it by pinion gear 15, Fig. 10. As in this reversing operation, the driven shaft 17 is rotated by the gear or pinion 15 in a direction reverse to that given it by the Geneva drive, it in turn rotates the gear or pinion 58 and its meshing intermediate gear 59, and the latter returns its rack 62 whereby both racks and associated gears operate in unison to return the hopper.

Figure 8:
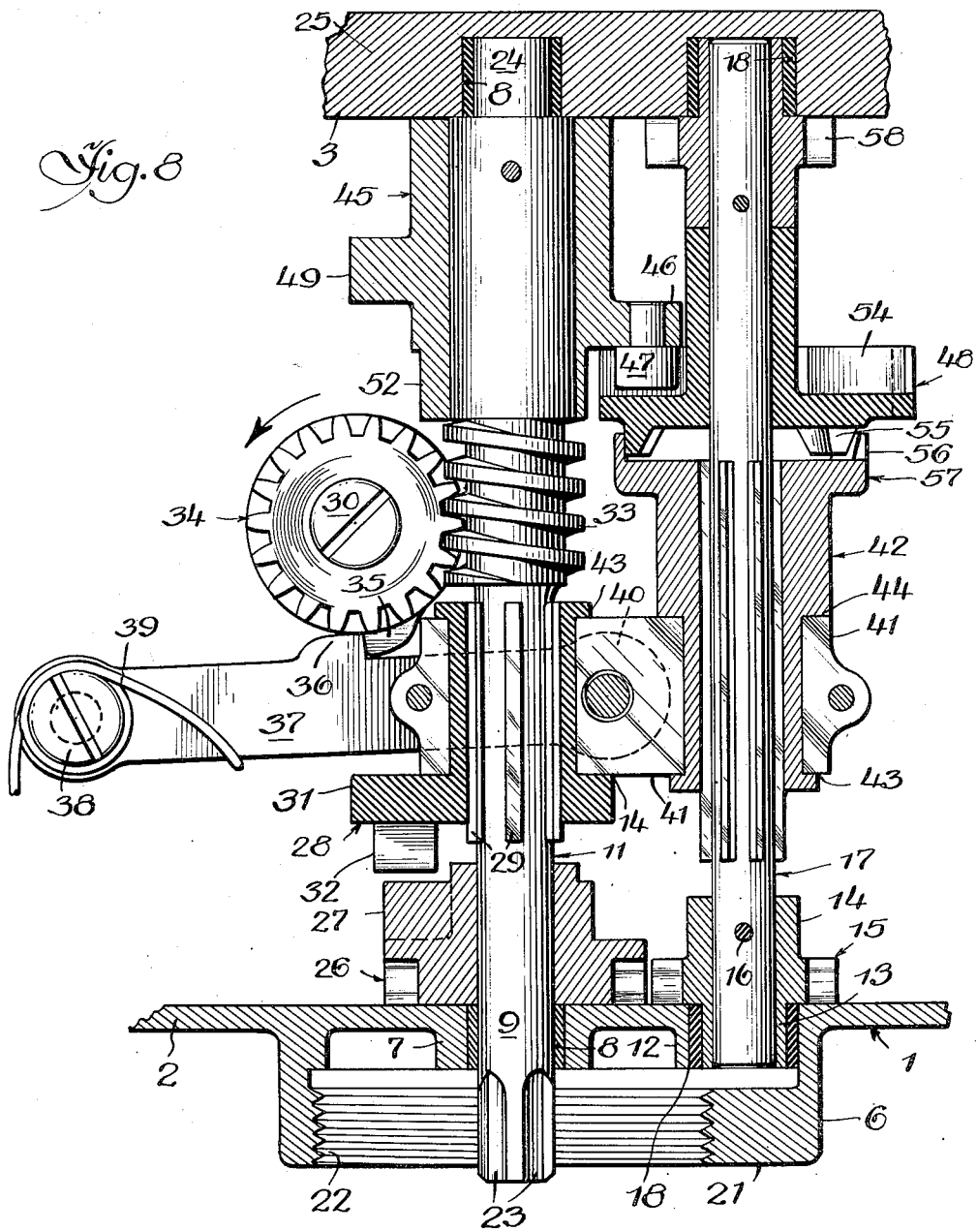
Fig. 8 is an enlarged fragmentary cross sectional view taken in a plane represented by the line 8—8 of Fig. 7.

As soon as the hopper has been returned, the cam surface 35 disengages from the cam surface 36 on the clutch actuating arm 37 and the latter is returned to the position shown in Fig. 8 by its spring 39. In that position, the Geneva drive is again clutched to the driven shaft 17 and the rack return gear 26 is disengaged from the lug 32 on the slidable sleeve 28.

To accomplish the cube cutting operation, the two cams 31 and 49 during each revolution of the drive shaft 11, engage a pair of projections 64 depending from the underside of holder 51 which carries a cut-off blade 65. The return of the holder 51 to its lowered or inoperative position is accomplished by a pair of coil springs 66. Holder 51 is provided at one end 67 with a pair of pivot ears 68 (Fig. 4), one at each side, for receiving a shaft, journaled in aligned openings in the opposite side walls 2 and 3. To lock the shaft or cross pin 69 against lateral movement, the blade support is longitudinally slotted to provide a centrally disposed tongue 71 which rests in a transverse slot 72 on the underside of the shaft.

The knife carrying end 73 of the blade support is downwardly inclined and terminates with a depending flange 74 to which is removably secured as at 75 the cut-off blade 65 having a cutting edge 77 at its upper end. To permit facile attachment or removal, the blade is preferably provided with keyhole slots 78 (Fig. 2) for receiving the heads of studs 75.

Above the blade holder 51 is carried a cutting pan 79 (Figs. 5, 7, 9 and 12) provided with a plurality of vertical cutting blades 81 equally spaced apart across the one end of the pan 79 and staked thereto, and above these vertical blades is a horizontal blade 83 having its cutting edge 84 rearwardly disposed for cutting or shearing off the horizontal upper surface of the layer to be diced and the vertical blade 81 cutting this layer into the desired number of longitudinal strips. The cutting pan is removably secured in place by spaced transverse slots 85 (Fig. 12) provided at one end and adapted to fit over similarly spaced upstanding lugs 86 on the main housing 1. At its other end the cutting pan rests upon bar 87 having its opposite ends 88 anchored in the side walls 2 and 3 of the main housing (Figs. 4 to 8, inclusive).

After the fruit or vegetable is cut into narrow strips by the vertically disposed cutting blades 81 and the transverse blade 83 by intermittent extrusions during each revolution of the drive shaft 11, the cutting blade 65 is elevated by the raising cams 31 and 49 engaging the tracks 64, whereby the diced sections 89 (Fig. 9) are severed and drop into a receptacle provided therefor.

Receptacle 63 is provided with upstanding end walls 91 and 92 and side walls 93, the end wall 91 being provided with a depending offset portion 94 with a plurality of protruding blocks 95 cast integral therewith. Blocks 95 are spaced apart sufficiently to pass between the vertical blades 81 and the horizontal blade 83, at the end of the forward cutting strokes of the hopper. The side walls 93 are formed on their exterior surfaces with projecting lugs 97 (Fig. 10) adapted to be received in spaced bayonet slots 98 provided in the slidable gear racks slidable upon opposite side rails 101.

Figure 6:
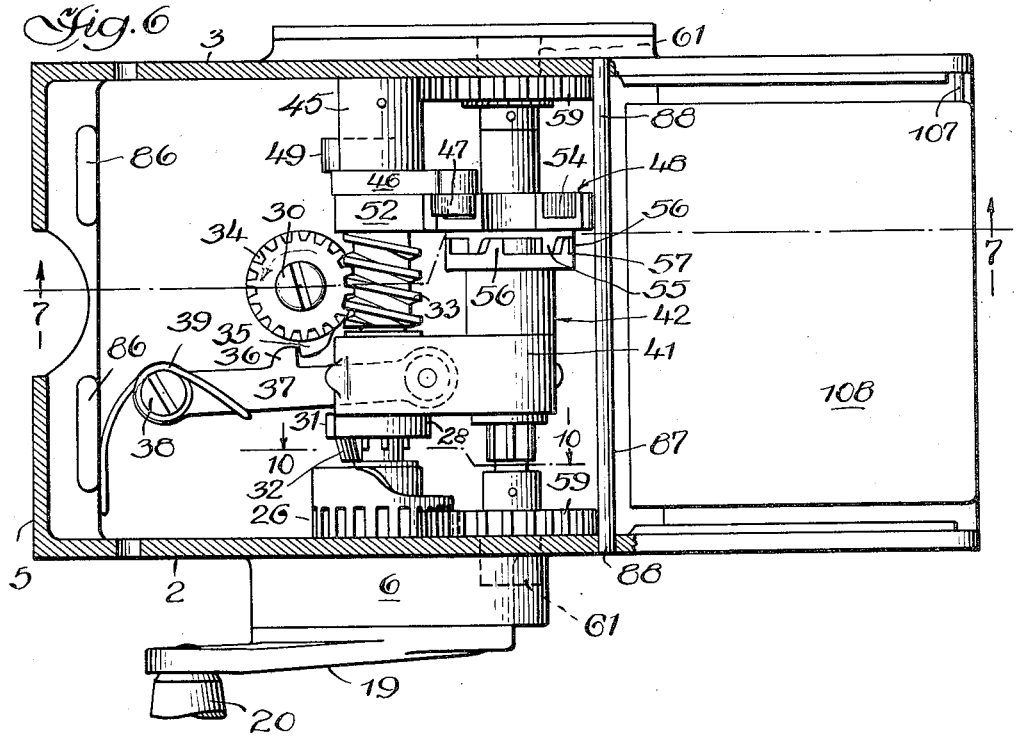
Fig. 6 is a view similar to Fig. 4 but with the support for the cut-off blade completely removed and the operating mechanism shown at the instant the hopper has been returned to its retracted position and is ready to begin a sequence of cutting operations.
Figure 7:
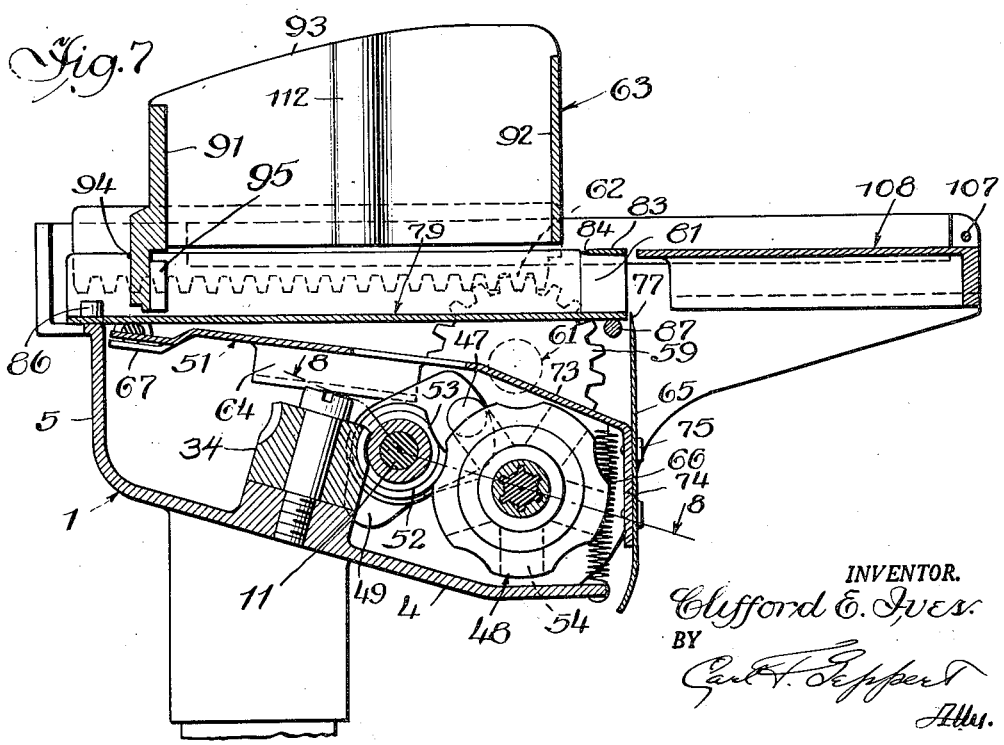
Fig. 7 is a view in vertical cross section taken longitudinally through the main housing, hopper and operating mechanism, the view being taken in a plane represented by the line 7—7 of Fig. 6.

The slidable gear rack assembly at each side of the housing includes a gear rack 62 and a guide strip 102 (Fig. 2) secured to an outwardly projecting and horizontally disposed flange 103 of the gear rack to provide therebeneath a downwardly opening channel for reception of the side rail 101 and a guide strip 104 affixed to the inner side of each side rail. The gear racks 62 are each provided with an upstanding lug 105 adapted to lock the lugs 97 in the ends of the bayonet slots (see Figs. 1 and 10), when engaged by latches 106 pivotally mounted on the sides of the hopper. In this latched position the hopper is locked to and moves with the rack, there being one of these latches preferably provided upon each of the opposite two sides of the hopper to lock the parts tightly together. The forward movement of the racks 62 are limited by the pin 107 at the forward end of the shelf or ledge 108 (Figs. 6 and 7).

A pressure block 109 is preferably provided in the hopper, having on its opposite sides 110 on their exterior with a vertically arranged channel 111 to receive the ribs 112 on the interior surfaces of the opposite side walls 93 of the hopper receptacle 63. Thus by applying pressure to the pressure block, the produce being diced may be maintained firmly and safely on the cutting pan 79 as such produce is fed to the cutting knives by the forward movement of the hopper through the operation of the crank arm or power drive.

To mount the dicer in position upon a table or other support, the main housing 1 is provided with a tubular extension 113 having a reduced neck 114 adapted to be received in a socket 115 provided at the upper end of a pedestal 116 on a base clamp 117 and retained in place by a suitable clamping screw 118. In order to lock the neck in the socket and prevent relative rotation, this socket 115 is slit longitudinally and provided with spaced lugs or wings 119 for receiving an adjustable clamping screw 121.

In the operation of the device, the base clamp 117 is mounted upon a table or other support and the dicer assembly mounted thereon and locked against rotation. Assuming the parts are assembled as in Fig. 1 with the hopper 63 locked in position by the latches 106, this hopper is ready to receive the vegetable or other produce or product to be diced and begin its forward cycle. Then rotating the drive shaft 11 in a counter-clockwise direction through the crank arm 19 and handle 20 or through a motor mounted for power actuation, moves the rack assemblies 62 successively forward a predetermined distance or stroke over the cutting pan 79 and ledge or shelf 108 through the intermittent operation of the Geneva gear 48, driven shaft 17 and the associated pinions or gears for operating the racks.

At the end of each intermittent forward movement or stroke, the spaced raising cams 31 and 49 on the drive shaft elevate the blade holder or support 51 and raise this support and its cut-off blade 65 to cut off or sever the diced sections 89 for the remainder of the produce to be diced. To prevent the eccentric 46 from also engaging and elevating the blade support 51 and its blade 65, this support is slotted at 122 to provide clearance for the eccentric.

During the ninth stroke or intermittent movement, the splined sleeve 28 is clutched to the rack return gear 26 loose on the drive shaft, and simultaneously the splined sleeve 42 is declutched from the Geneva gear 48 so that the driven shaft 17 is free to rotate in a reverse direction from that accorded it by the Geneva movement. As the splined sleeve 28 now drives the rack return gear 26 and the latter in turn rotates the intermediate gear 59 and drives the racks 62 in a direction reverse to that previously given them, the racks 62 and hopper 63 are quickly retracted for the full length of their stroke to the position shown in Fig. 1 for another series of progressive and successive cutting operations.

From the above description and the disclosure in the drawings, it will be readily apparent that the present invention comprehends a novel dicer construction that is efficient and positive in operation and one that requires a minimum of attention.

Having thus disclosed the invention, I claim:

1. A device for dicing produce such as vegetables, fruits and the like, comprising a housing, a cutting pan removably mounted within the housing and provided with a plurality of spaced, vertically and longitudinally positioned cutting blades disposed at the forward end of the pan for slicing the produce lengthwise and a transverse blade extending across the top of the plurality of blades for cutting the produce into a plurality of strips, a movable cut-off blade beneath the cutting pan, a hopper slidably mounted on and movable over the cutting pan for feeding the produce thereto, and operating mechanism in the housing for successively and progressively moving the hopper and produce over the cutting pan a predetermined distance and thereupon actuating the cut-off blade to sever the strips into diced sections, and means for actuating the operating mechanism.

2. A device for dicing produce such as vegetables, fruits and the like into substantially rectangular and uniform sections, comprising a housing, a cutting pan mounted in the upper portion of the housing and provided at its forward end with a plurality of blades so constructed and arranged as to slice the lower portion of the produce resting thereon into strips, a receptacle slidably mounted on the pan and providing a hopper for supplying the produce to and moving it across the pan, operating mechanism in the housing and including a drive shaft, a driven shaft, a Geneva movement for translating continuous rotation of the drive shaft into an intermittent and progressive partial rotation of the driven shaft, and gearing associated with the driven shaft and receptacle for transmitting the intermittent and progressive partial rotation of the driven shaft into an intermittent and progressive longitudinal movement of the receptacle, means for continuously rotating the drive shaft, and a cut-off blade actuated upon rotation of the drive shaft for cutting the strips of produce previously sliced into diced sections.

3. A device for dicing vegetables and other produce, comprising a housing, a stationary cutting pan mounted in the housing and provided with a plurality of blades for cutting the produce into strips to form diced sections, a hopper mounted above the cutting pan and adapted to be moved thereover in successive and progressive strokes, said hopper being adapted to receive and supply the produce to be diced to the cutting pan and to feed such produce to the cutting blades, a drive shaft and a driven shaft rotatably mounted in the housing, means for continuously rotating the drive shaft, mechanism associated with the drive and driven shafts for translating the continuous rotation of the drive shaft into an intermittent and progressive rotation of the driven shaft, means for translating the intermittent and progressive rotation of the driven shaft into a progressive series of intermittent linear movements of the hopper over the cutting pan and thereby cause successive cutting operations, and a cut-off blade actuated by the drive shaft at the end of each linear movement.

4. In a device for dicing vegetables and other produce, including a housing adapted to be mounted upon a support, a plurality of cutting knives mounted in the housing, a receptacle movable over the housing and cutting knives, a drive shaft and a driven shaft rotatably mounted in the housing, means for continuously rotating the drive shaft, a Geneva movement associated with the drive and driven shafts and including a drive pin carried by the drive shaft and a Geneva gear loose upon the driven shaft, a clutch splined on the driven shaft and shiftable into and out of clutching engagement with the Geneva gear whereby continuous rotation of the drive shaft causes the drive pin to engage a station of the Geneva gear during each revolution of the drive shaft and move the Geneva gear and driven shaft progressively and intermittently through a predetermined arc of movement equal to the angle between stations, a rack and gearing connected to the driven shaft for translating the intermittent and progressive arc of movement of the driven shaft into an intermittent and progressive linear movement of the rack, means for connecting the rack to the receptacle for moving the receptacle through a series of intermittent and progressive cutting strokes, a cut-off blade operable at the end of each such movement of the rack, a rack return gear, and a clutch actuating arm for disconnecting the clutch from the Geneva gear when the rack and receptacle have reached the limit of their final cutting stroke and for engaging the rack return gear to return the rack and receptacle for commencing a new series of cutting strokes.

5. An apparatus for dicing fruit or vegetable solids comprising a principal housing equipped with accessories for table mounting and affording a pair of horizontally parallel side rails, said housing including opposite wall portions in which are formed journals for a pair of shafts, a stationary splitting pan which comprises a horizontal floor plate having at its forward end spaced cutting blades and at its rearward end being apertured to receive upstanding anchor lugs that extend from the main housing, a continuously rotatable drive shaft and an intermittently rotatable driven shaft journaled in said housing walls in parallel relation to each other, a feed hopper slidably supported on said rails for containing fruit or vegetable solids for splitting action by said pan which comprises vertical wall elements defining a rectangular enclosure with the rearmost wall having a depending offset portion which functions as a vegetable pusher and extends into the horizontal level of said splitting pan, a power transmitting train for translating complete rotations of said drive shaft into incremental rotary movements with intervening rest intervals of said driven shaft, gear and rack mechanism between said driven shaft and said feed hopper for advancing said hopper incrementally in a linear direction relative to said splitting pan, and a cut-off knife for severing diced portions from splittings emerging from said pans, said knife being actuated by said continuously rotatable shaft, whereby there is performed a cut-off operation during the brief rest intervals which intervene said incremental advancements of said hopper.

6. The combination set forth in claim 5 in which each said continuously rotatable and intermittently rotatable shafts are equipped with axially slidable clutch members in combination with a worm and pinion driven device driven by said continuously rotatable shaft, and a shifting lever operated by said device for simultaneously declutching intermittently rotatable shaft clutch and for effecting the engagement of said continuously rotatable shaft clutch for thereby returning said feed hopper rapidly to its starting position after it has attained its full extremity destination in its said splitting action.

7. The combination set forth in claim 5 in which the gears for advancing said feed hopper and its racks are continuously meshed with forward motion advancement pinions and with quick return pinions, said forward motion pinions being clutch driven by said intermittent motion shaft and said quick return pinions being clutch driven by said continuously rotatable shaft, and a spring loaded shift apparatus for disengaging said intermittent motion shaft clutch and for concurrently engaging said quick return shaft clutch when said hopper reaches its full limit of forward advance.

CLIFFORD E. IVES.

REFERENCES CITED

The following references are of record in the file of this patent:

UNITED STATES PATENTS

| Number | Name | Date |
|---|---|---|
| 653,385 | Howell | July 10, 1900 |
| 1,395,482 | Davidson | Nov. 1, 1921 |
| 1,865,936 | White | July 5, 1932 |
| 2,157,604 | Gray | May 9, 1939 |
| 2,179,050 | Montague | Nov. 7, 1939 |